United States Patent
Chan et al.

(10) Patent No.: US 9,032,261 B2
(45) Date of Patent: May 12, 2015

(54) SYSTEM AND METHOD OF ENHANCING DATA RELIABILITY

(71) Applicant: Skymedi Corporation, Hsinchu (TW)

(72) Inventors: Li-Hsiang Chan, Hsinchu (TW); You-Chang Hsiao, Hsinchu (TW)

(73) Assignee: Skymedi Corporation, Hsinchu (TW)

( * ) Notice: Subject to any disclaimer, the term of this patent is extended or adjusted under 35 U.S.C. 154(b) by 233 days.

(21) Appl. No.: 13/869,326

(22) Filed: Apr. 24, 2013

(65) Prior Publication Data

US 2014/0325294 A1 Oct. 30, 2014

(51) Int. Cl.
*G06F 11/00* (2006.01)
*G06F 11/07* (2006.01)

(52) U.S. Cl.
CPC .................... *G06F 11/076* (2013.01)

(58) Field of Classification Search
CPC .. G06F 11/076; H04L 1/0002; H04L 25/4917
USPC .................. 714/708, 706, 718, 769
See application file for complete search history.

(56) References Cited

U.S. PATENT DOCUMENTS

| | | | |
|---|---|---|---|
| 6,338,145 B1 | 1/2002 | Yudenfriend et al. | |
| 6,662,322 B1 * | 12/2003 | Abdelilah et al. | 714/708 |
| 6,826,157 B1 * | 11/2004 | Davis et al. | 370/252 |
| 7,254,373 B2 * | 8/2007 | Paljug et al. | 455/90.3 |
| 7,386,767 B1 | 6/2008 | Xue et al. | |
| 7,631,228 B2 * | 12/2009 | Brittain et al. | 714/704 |
| 8,255,740 B2 | 8/2012 | Kamath et al. | |
| 8,296,620 B2 | 10/2012 | Chen et al. | |
| 2007/0011513 A1 * | 1/2007 | Biswas et al. | 714/722 |
| 2012/0226959 A1 | 9/2012 | Xie et al. | |

* cited by examiner

*Primary Examiner* — David Ton
(74) *Attorney, Agent, or Firm* — Donald E. Stout; Stout, Uxa & Buyan, LLP

(57) ABSTRACT

In a system and method of enhancing data reliability, a reference value associated with error count is obtained, and an error count of data stored in a buffer is obtained whenever an event is triggered. An accumulated value associated with error counts is acquired when the recorded error count is greater than an error threshold value. System slowdown is performed when the accumulated value is greater than a predetermined value.

27 Claims, 5 Drawing Sheets

SYSTEM AND METHOD OF ENHANCING DATA RELIABILITY

BACKGROUND OF THE INVENTION

1. Field of the Invention

The disclosure generally relates to a memory system, and more particularly to a system and method of enhancing data reliability.

2. Description of Related Art

A flash memory is one kind of a non-volatile solid state memory device that can be electrically erased and reprogrammed. In order to attain higher capacity, more memory dies (or chips) are vertically stacked. Further, speed has been increasing owing to improvement in process technology. The dilemma is that a flash memory with higher speed will generate more heat, which increases temperature of the flash memory to render it susceptible to more errors. As a result, the flash memory increases speed at the cost of its data reliability.

In order to overcome the problems mentioned above, a need has thus arisen to propose a novel scheme of enhancing data reliability of the flash memory without substantially sacrificing its speed.

SUMMARY OF THE INVENTION

In view of the foregoing, it is an object or feature of the present invention to provide a system and method of enhancing data reliability. In one embodiment, the disclosed system/method provides a scheme of dynamically switching operating speed in consideration of data reliability.

According to one embodiment, a reference value associated with error count of a memory device is obtained, and an error count of data stored in a buffer is obtained whenever an event is triggered during a memory access operation. The error count is compared with an error threshold value, which is greater than the reference value. An accumulated value associated with error counts is acquired, when the error count is greater than the error threshold value. The accumulated value is compared with a predetermined value, and system slowdown is performed when the accumulated value is greater than the predetermined value.

DETAILED DESCRIPTION OF THE INVENTION

Figure 1:
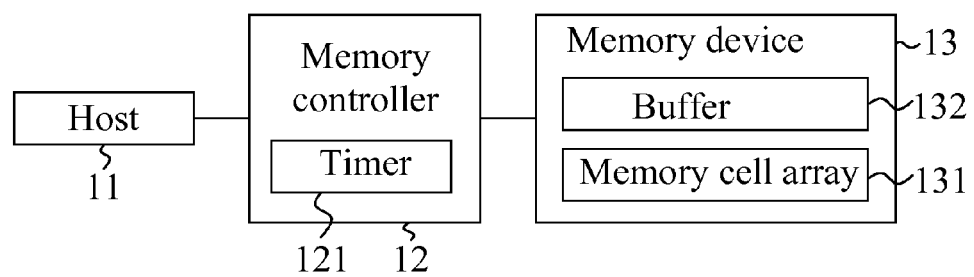
FIG. 1 shows a block diagram illustrative of a memory system with enhanced data reliability according to one embodiment of the present invention.

FIG. 1 shows a block diagram illustrative of a memory system 100 with enhanced data reliability according to one embodiment of the present invention. In the embodiment, a host 11 (e.g., a computer or a phone) may be adaptably coupled to a memory controller 12, which may be further adaptably coupled to a memory device 13. Accordingly, the memory controller 12 may be disposed between the host 11 and the memory device 13. The memory controller 12 of the embodiment may include a timer 121, implemented in either hardware or software, configured to measure a time interval.

Figure 2A:
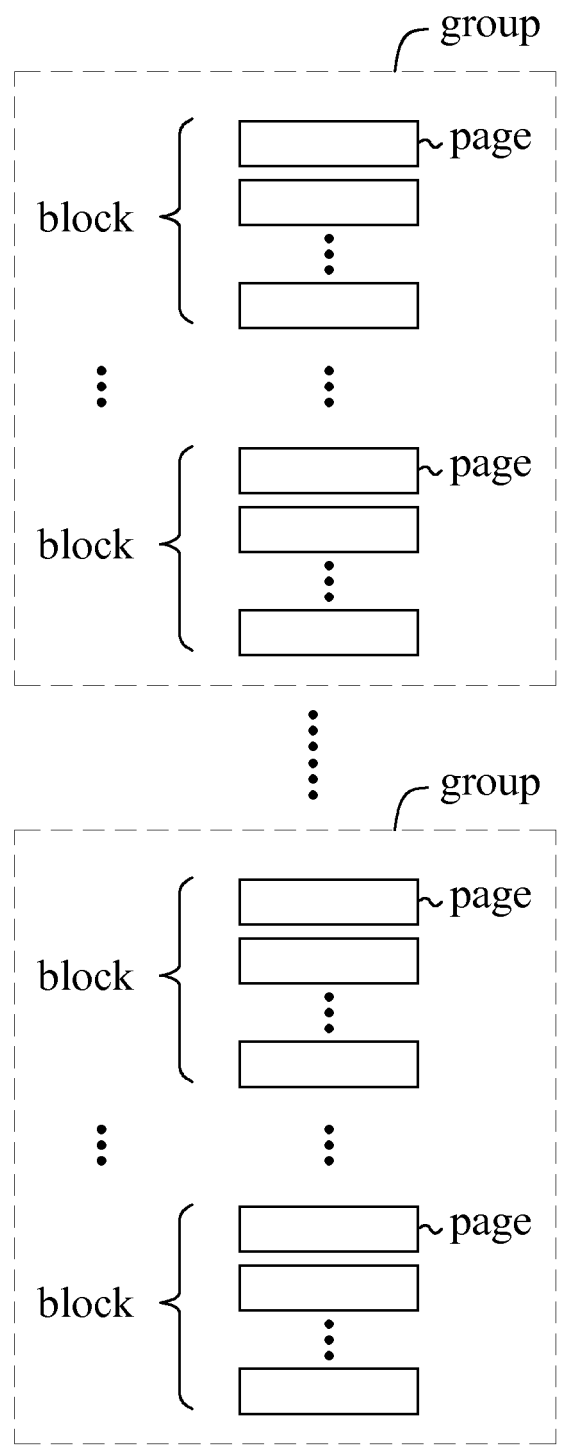
FIG. 2A and FIG. 2B show exemplary memory devices of FIG. 1.
Figure 2B:
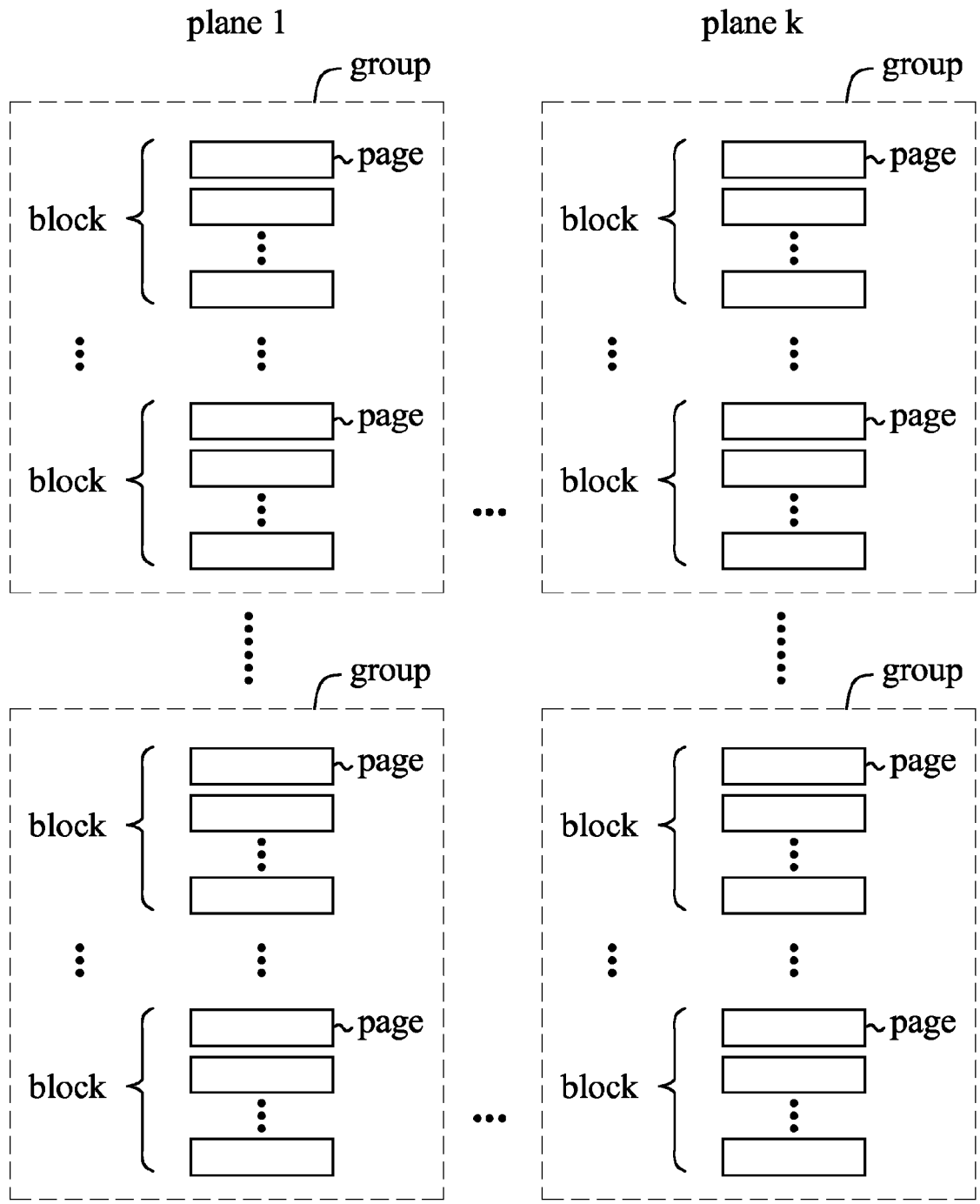

The memory device 13 of the embodiment may be a non-volatile memory device such as a flash memory. Specifically speaking, the memory device 13 may include a memory cell array 131, which may be configured in pages and/or blocks. FIG. 2A shows an exemplary memory device 13, the memory cell array 131 of which may be configured in a plurality of blocks, each of which is comprised of plurality of pages. The blocks may be organized into groups each having a plurality of blocks. FIG. 2B shows another exemplary memory device 13, which may include a plurality of planes, which may belong to the same memory cell array 131 or different memory cell arrays 131. For example, the planes may belong to the memory cell arrays of different memory dies, respectively. Each plane may be configured in a plurality of blocks, each of which is comprised of plurality of pages. The blocks may be organized into groups each having a plurality of blocks.

The memory device 13 of the embodiment may also include a buffer 132 configured to store data temporarily. For example, in a read operation, data may be temporarily stored in the buffer 132 before the data being transferred out of the memory device 13. In a write operation, data may be temporarily stored in the buffer 132 before the data being written (or programmed) to the memory cell array 131. In a copyback operation, data may be temporarily stored in the buffer 132 before the data being transferred from one location of the memory cell array 131 to another location of the memory cell array 131.

Although the buffer 132 is disposed in the memory device 13 as exemplified in FIG. 1, it is appreciated that a buffer (not shown) may be disposed in the memory controller 12 instead, or two buffers may be disposed in the memory device 13 and the memory controller 12, respectively. Alternatively, the buffer 132 may be disposed in a place other than the memory device 13 and the memory controller 12. The present embodiment assumes the buffer 132 is disposed in the memory device 13, but cannot be used to limit the claimed invention.

Figure 3:
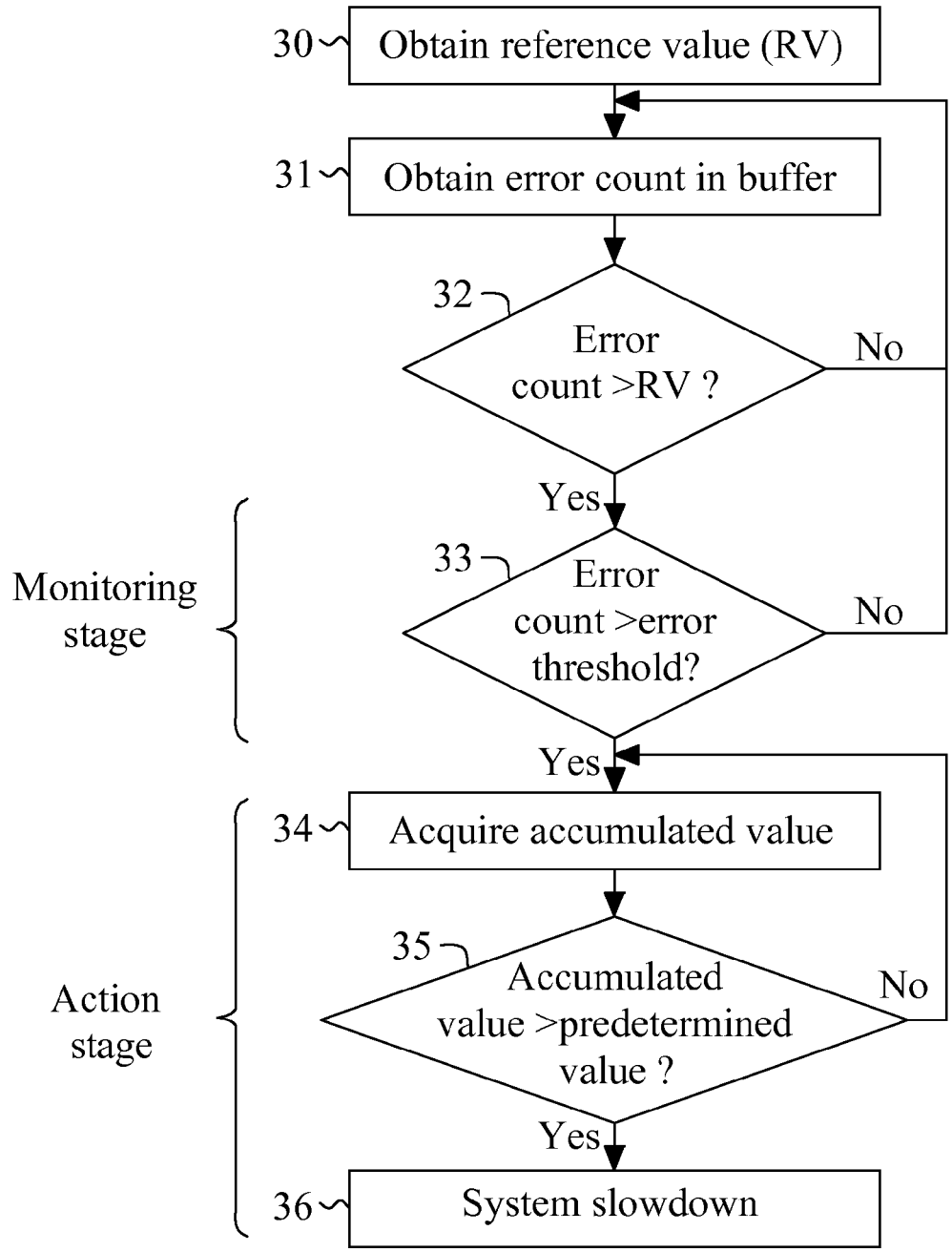
FIG. 3 shows a flow diagram illustrative of a method of enhancing data reliability according to one embodiment of the present invention.

FIG. 3 shows a flow diagram illustrative of a method of enhancing data reliability according to one embodiment of the present invention. In step 30, a reference value (RV) associated with error count (e.g., error bit) of the memory device 13 is obtained, for example, while the memory device 13 is initialized or booted. During the initialization of the memory device 13, a logic-to-physical address mapping table is constructed. In the embodiment, the reference value may be obtained by averaging error counts (e.g., error bits) of a plurality of blocks of the memory cell array 131 according to the logic-to-physical address mapping table.

In one example, the reference value is obtained by averaging the error counts of at least some blocks of a group (or groups). In another example, the reference value is obtained by averaging the error counts of all blocks of the memory cell array 131. In a further example, the reference value is obtained by averaging the error counts of at least one specific block (e.g., the first and/or the second block of each group) of the groups in the memory cell array 131. With respect to the examples discussed above, the error count of the block may be a sum or an average of error counts of pages in the block. Alternatively, the error count of the block may be a sum or an average of at least one specific page (e.g., the first and/or the second page of each block) of the blocks.

Referring back to FIG. 3, in step 31, error count of data in the buffer 132 is obtained (for example, by the memory controller 12) whenever an event has happened during a memory access operation. As mentioned above, the memory access operation of the embodiment may be a copyback operation, a write operation, a read operation or an erase operation. In one embodiment, the event may be triggered by behavior of the host 11. For example, the host 11 issuing a test unit ready command, used to determine if the memory controller 12 is ready to transfer data, will trigger the event. In another embodiment, the event may be triggered by the timer 121 (of the memory controller 12) when a predetermined time has elapsed. In a further embodiment, the event may be triggered by behavior of the memory device 13. For example, the event will be triggered whenever a predetermined amount of blocks has been subjected to programming or erasing. In another example, the event will be triggered whenever a predetermined amount of retired blocks, in which stored data are uncorrectable, has been identified. It is noted that, in general, the event may be triggered when one or more of the illustrated schemes (i.e., the host's behavior, the timer 121 and the memory device's behavior) have been asserted.

Subsequently, in step 32, the error count is compared (for example, by the memory controller 12) with the reference value. When the error count is greater than the reference value (in step 32), for example, at point A (FIG. 4), the flow enters into a monitoring stage beginning at step 33.

Figure 4:
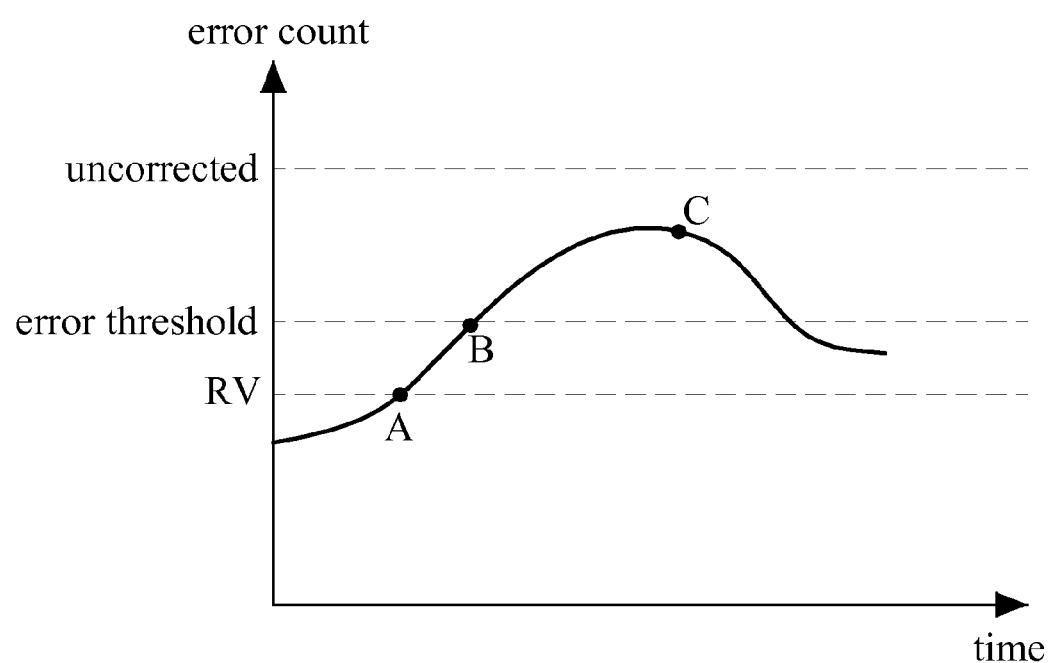
FIG. 4 shows an exemplary curve comprised of the error counts.

In step 33, the error count is compared (for example, by the memory controller 12) with an error threshold value, which is greater than the reference value and may be determined according to (or depending on) the value of the reference value. FIG. 4 shows an exemplary curve comprised of the error counts. When the error count is greater than the error threshold value (in step 33), for example, at point B, the flow enters into an action stage beginning at step 34.

In step 34, an accumulated value associated with error counts of triggered events during a memory access operation is acquired. As mentioned above, the memory access operation of the embodiment may be a copyback operation, a write operation, a read operation or an erase operation. In one embodiment adopting the host's behavior to trigger the events, the acquired accumulated value is an amount (i.e., the number of times) of the events (e.g., issuing a test unit ready command) with error counts being greater than the error threshold value. In another embodiment adopting the timer 121 to trigger the events, the acquired accumulated value is the time interval (for example, measured by the timer 121), during which error counts being greater than the error threshold value, measured by the timer 121. In a further embodiment adopting the memory device's behavior to trigger the events, the acquired accumulated value is an amount (i.e., the number of times) of the events (e.g., programming/erasing a predetermined amount of blocks with error counts being greater than the error threshold value.

Subsequently, in step 35, the accumulated value is compared (for example, by the memory controller 12) with a predetermined value. If the accumulated value is greater than the predetermined value (in step 35), for example, at point C in FIG. 4, the flow enters into system slowdown (step 36); otherwise, the flow goes back to step 34. As mentioned above, the error threshold value may be determined according to the reference value. Moreover, the predetermined value may be determined according to a trend in the monitoring stage. For example, if the error count curve (FIG. 4) has a sharp rise in the monitoring stage (e.g., between point A and point B), the predetermined value may then be set lower in order to fast cope with deterioration situation caused, for example, by temperature increase or other mechanism in the memory device 13. On the contrary, if the error count curve (FIG. 4) is flat in the monitoring stage, the predetermined value may thus be set higher.

In step 36, at least some portion of the memory system 100 is slowed down. The slowdown portion of the memory system 100 may, for example, slow down an interface (not shown) of the memory device 13 to limit the IO data rate and/or slow down the frequency of a processor (not shown) of the memory controller 12. The system slowdown may be arrived by performing some dummy operations (e.g., operations associated with debug information) by the host 11. The system slowdown may also be achieved (for example, by the memory controller 12) by controlling the fundamental operation of the memory. For example, separating program/erase operations in time with proper time gap between adjacent program/erase operations.

Although specific embodiments have been illustrated and described, it will be appreciated by those skilled in the art that various modifications may be made without departing from the scope of the present invention, which is intended to he limited solely by the appended claims.

What is claimed is:

1. A method of enhancing data reliability, comprising:
   obtaining a reference value associated with error count of a memory device;
   obtaining an error count of data stored in a buffer whenever an event is triggered during a memory access operation;
   comparing the error count with an error threshold value, which is greater than the reference value;
   acquiring an accumulated value associated with error counts when the error count is greater than the error threshold value;
   comparing the accumulated value with a predetermined value; and
   performing system slowdown when the accumulated value is greater than the predetermined value.

2. The method of claim 1, wherein the reference value is obtained while the memory device is initialized or booted, during which a logic-to-physical address mapping table is constructed.

3. The method of claim 2, wherein the reference value is obtained by averaging error counts of at least some pages of the memory device.

4. The method of claim 1, before the step of comparing the error count with the error threshold value, further comprising a step of comparing the error count with the reference value.

5. The method of claim 1, wherein the memory access operation comprises a copyback operation, a write operation or a read operation or an erase operation.

6. The method of claim 1, wherein the event is triggered by behavior of a host.

7. The method of claim 6, wherein the event is triggered when the host issues a test unit ready command.

8. The method of claim 6, wherein the acquired accumulated value is an amount of the events with error counts being greater than the error threshold value.

9. The method of claim 1, wherein the event is triggered by a timer of a memory controller when a predetermined time has elapsed.

10. The method of claim 9, wherein the acquired accumulated value is a time interval during which error counts being greater than the error threshold value.

11. The method of claim 1, wherein the event is triggered by behavior of the memory device.

12. The method of claim 11, wherein the event is triggered whenever a predetermined amount of blocks of the memory device has been subjected to programming or erasing, or whenever a predetermined amount of retired blocks of the memory device has been identified.

13. The method of claim 11, wherein the acquired accumulated value is an amount of the events with error counts being greater than the error threshold value.

14. The method of claim 1, wherein the system slowdown is performed on an interface of the memory device and/or a processor of a memory controller.

15. The method of claim 1, wherein the system slowdown comprises performing a plurality of dummy operations by a host.

16. The method of claim 1, wherein the system slowdown comprises separating program/erase operations in time with proper time gap between adjacent program/erase operations.

17. A system of enhancing data reliability, comprising:
a host;
a memory controller adaptably coupled to the host;
a memory device adaptably coupled to the memory controller, the memory device; and
a buffer configured to store data associated with a memory access operation;
wherein the memory controller performs:
obtaining a reference value associated with error count of the memory device;
obtaining an error count of data in the buffer whenever an event is triggered during the memory access operation;
comparing the error count with an error threshold value, which is greater than the reference value;
acquiring an accumulated value associated with error counts when the error count is greater than the error threshold value; and
comparing the accumulated value with a predetermined value;
wherein at least a portion of the memory system is slowed down when the accumulated value is greater than the predetermined value.

18. The system of claim 17, wherein the memory device comprises a flash memory.

19. The system of claim 17, wherein the event is triggered by behavior of the host.

20. The system of claim 19, wherein the event is triggered when the host issues a test unit ready command.

21. The system of claim 19, wherein the acquired accumulated value is an amount of the events with error counts being greater than the error threshold value.

22. The system of claim 17, wherein the memory controller comprises a timer configured to measure a time interval, and the event is triggered by the timer when a predetermined time measured by the timer has elapsed.

23. The system of claim 22, wherein the acquired accumulated value is a time interval during which error counts being greater than the error threshold value.

24. The system of claim 17, wherein the event is triggered by behavior of the memory device.

25. The system of claim 24, wherein the event is triggered whenever a predetermined amount of blocks of the memory device has been subjected to programming or erasing, or whenever a predetermined amount of retired blocks of the memory device has been identified.

26. The system of claim 24, wherein the acquired accumulated value is an amount of the events with error counts being greater than the error threshold value.

27. The system of claim 17, wherein the system slowdown is performed on an interface of the memory device and/or a processor of a memory controller.

* * * * *